United States Patent
Watanabe et al.

(10) Patent No.: US 7,859,799 B2
(45) Date of Patent: Dec. 28, 2010

(54) MAGNETORESISTIVE HEAD AND A MANUFACTURING METHOD THEREOF

(75) Inventors: Katsuro Watanabe, Tokyo (JP); Taku Shintani, Tokyo (JP); Kazuhiro Ueda, Tokyo (JP); Masahiro Osugi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 989 days.

(21) Appl. No.: 11/706,152

(22) Filed: Feb. 13, 2007

(65) Prior Publication Data

US 2007/0206333 A1 Sep. 6, 2007

(30) Foreign Application Priority Data

Feb. 14, 2006 (JP) ............................. 2006-036092

(51) Int. Cl.
*G11B 5/127* (2006.01)

(52) U.S. Cl. .................................. 360/324.1

(58) Field of Classification Search ............. 360/324.1, 360/324.11, 324.2, 324.12, 313
See application file for complete search history.

(56) References Cited

U.S. PATENT DOCUMENTS

| | | | |
|---|---|---|---|
| 6,381,107 B1 | 4/2002 | Redon et al. | |
| 6,754,053 B2 | 6/2004 | Yoshikawa et al. | |
| 6,952,328 B2 | 10/2005 | Hasegawa | |
| 6,992,870 B2 | 1/2006 | Kagami et al. | |
| 7,038,893 B2 | 5/2006 | Koui et al. | |
| 7,057,859 B2 | 6/2006 | Kagami et al. | |
| 7,525,765 B2 * | 4/2009 | Kurita et al. | 360/235.4 |
| 7,729,088 B2 * | 6/2010 | Kurita et al. | 360/234.4 |

2002/0191354 A1 12/2002 Yoshikawa et al.

(Continued)

FOREIGN PATENT DOCUMENTS

JP 2000-311317 A 11/2000

(Continued)

OTHER PUBLICATIONS

International Search Report dated Jan. 7, 2008 for the corresponding European patent application EP07250152.

*Primary Examiner*—Allen T Cao
(74) *Attorney, Agent, or Firm*—Patterson & Sheridan, LLP

(57) ABSTRACT

Embodiments in accordance with the present invention reduce the influence of etching damage at junction edge of a magnetoresistive film in the sensor height direction, lower the deterioration of dielectric breakdown voltage between an upper magnetic shield layer and a lower magnetic shield layer and instability of reproducing property resulting from shield process, and maintain electrostatic capacity to a small value in a CPP magnetoresistive head. In an embodiment of a magnetoresistive head of the present invention, length in the sensor height direction of bottom surface of a pinning layer is longer than the length in the sensor height direction of bottom surface of a first ferromagnetic layer. The angle formed by an edge in the sensor height direction of the pinning layer to the surface extended from a bottom surface of a magnetoresistive film is smaller than the angle formed by an edge in the sensor height direction of a second ferromagnetic layer to the surface extended from a bottom surface of the magnetoresistive film. Height of top surface of a sensor height direction refill film is equal to or higher than the top surface of the magnetoresistive film.

13 Claims, 13 Drawing Sheets

U.S. PATENT DOCUMENTS

| | | |
|---|---|---|
| 2003/0099069 A1 | 5/2003 | Kagami et al. |
| 2003/0202294 A1 | 10/2003 | Terunuma |
| 2003/0231437 A1 | 12/2003 | Childress et al. |
| 2004/0012899 A1 | 1/2004 | Hasegawa et al. |
| 2004/0061986 A1 | 4/2004 | Kagami et al. |
| 2004/0150922 A1 | 8/2004 | Kagami et al. |
| 2004/0158973 A1 | 8/2004 | Arasawa et al. |
| 2005/0237667 A1* | 10/2005 | Chhabra et al. .......... 360/234.5 |
| 2009/0002897 A1* | 1/2009 | Machita et al. ............. 360/324 |
| 2009/0034129 A1* | 2/2009 | Yanagisawa et al. ........ 360/313 |
| 2009/0052089 A1* | 2/2009 | Antoku et al. ........... 360/245.3 |
| 2009/0274837 A1* | 11/2009 | Hara et al. ................. 427/128 |

FOREIGN PATENT DOCUMENTS

| | | |
|---|---|---|
| JP | 2002-299726 | 10/2002 |
| JP | 2003-204096 | 7/2003 |
| JP | 2003-204096 A | 7/2003 |
| JP | 2003-298143 | 10/2003 |
| JP | 2003-298147 | 10/2003 |
| JP | 2004-118978 | 4/2004 |

* cited by examiner

MAGNETORESISTIVE HEAD AND A MANUFACTURING METHOD THEREOF

CROSS-REFERENCES TO RELATED APPLICATIONS

The instant nonprovisional patent application claims priority to Japanese Patent Application 2006-036092, filed Feb. 14, 2006 and incorporated by reference herein for all purposes.

BACKGROUND OF THE INVENTION

A magnetoresistive sensor utilizing magnetoresistive effect in which an electric resistance changes in accordance with change in an external magnetic field has been known as an excellent magnetic field sensor and has been put into the practical use as a read head of magnetic head which is the principal component of a magnetic storage apparatus. Since the magnetic storage apparatus is continuously progressing in reduction in size and higher speed transfer, higher performance is also required for a magnetic head for reading and writing information. Measures for realization of higher output and higher transfer rate may be listed as the principal subjects of the read head among such requirement. In regard to higher output, development and improvement of a magnetoresistive film have been conducted. For recording density of about $3 \times 10^8$ bits per 1 $cm^2$, an anisotropic magnetoresistive (AMR) film has been used. For higher recording density, a giant magnetoresistive film (GMR) for attaining higher output has been developed. At present, further improvement has been conducted to such GMR. However, since it is feared that such GMR cannot provide sufficient output for the recording density higher than $9.3 \times 10^9$ bits per 1 $cm^2$, investigation and development have been conducted for the tunneling magnetoresistive film and CPP-GMR film, allowing a current to flow through the stacking surfaces of sensing films, as the next generation magnetoresistive film of the GMR film.

A magnetic head using the AMR film and GMR film is remarkably different in structure from a magnetic head using the tunneling magnetoresistive film and CPP-GMR film. The former has a CIP (Current Into the Plane) structure where the sensing current flows in the in-plane direction of the magnetoresistive film formed of the AMR film and GMR film. Meanwhile, the latter has a CPP structure where the sensing current is applied almost in the perpendicular direction to the plane of the magnetoresistive film formed of the tunneling magnetoresistive film and CPP-GMR film. Therefore, the electrodes for supplying the sensing current are provided in the manner that these electrodes are stacked on the magnetoresistive film.

As one of the peculiar subjects of a CPP structure head, it may be listed that a process is required to remove re-deposition deposited by the etching to the side wall of junction of the magnetoresistive film for detecting an external magnetic field. In general, the etching is conducted with a dry etching method, particularly with an ion milling method. However, in this case, a first etching process is conducted for executing the etching to almost the predetermined shape by irradiating the ion beam almost in the perpendicular angle to a substrate and thereafter a second etching process is conducted for removing re-deposition deposited to an edge in the sensor height direction of the junction by irradiating the ion beam in the shallower angle. In this process, since the ion beam is incident in the angle near to the comparatively perpendicular angle to the side wall of junction in the second etching process, a certain consideration is necessary to damage caused by the etching process more than the CIP structure which does not require the second etching process. Moreover, a problem also rises in the CPP structure head, in which when the second etching process is conducted, an edge in the sensor height direction easily becomes more steep, thereby a step is generated in the bottom surface of the upper magnetic shield layer, and such step will induce deterioration in the dielectric breakdown voltage between the upper magnetic shield layer and lower magnetic shield layer and instability in read performance resulting from magnetic shield layers.

A measure for higher transfer rate will become a problem peculiar to the CPP structure because measures for CIP structure head and CPP structure head, which are different in arrangement of electrodes for supplying the sensing current, are also different. In the CPP structure head, since electrostatic capacity C is generated with an upper electrode layer (an upper magnetic shield layer is also used in some cases) provided in the manner of stacking on the magnetoresistive film and a lower electrode layer (a lower magnetic shield layer is also used in some cases), the process for controlling these electrode layers not to becomes closer as required and the process for controlling the structure in the sensor height direction of these electrode layers for reproduction with good yield are necessary.

In regard to the shape of CPP structure head in the sensor height direction, references JP 2002-299726 A and JP 2003-298143 A disclose formation of a junction edge in the shape which is gradually curved in the CPP-GMR sensor. Moreover, the JP 2003-204096 A and JP 2004-118978 A disclose, in the TMR sensor, top surface of the pinned layer is flat and also disclose formation of a stepped junction edge having two straight tapers on the edges of upper layers over the pinned layer and lower layers under the pinned layer.

The patent documents JP 2002-299726 A and JP 2003-298143 A disclose a shape of a junction edge which is gradually curved in the sensor height direction but do not disclose a concrete structure of a magnetoresistive film so that an edge of any layer may have a steep taper and it is not apparent that an edge of any layer should have a gradual taper. In the patent document 2000-204096 A, a junction edge of the TMR sensor in the sensor height direction is formed in the shape of step including top surface of the pinned layer. However, an insulator film between the upper magnetic shield layer and lower magnetic shield layer is also formed in the shape of step, not consideration on reduction of electrostatic capacity. The patent document JP 2004-118978 A is similar to JP 2003-204096 A. These are different in the point that the pinned layer is longer than a free layer in the length of sensor height direction but shape of the pinned layer edge is not apparent. Moreover, an electrode for generating electrostatic capacity is formed of the upper magnetic shield layer and the pinned layer and distance between layers is shorter than the upper magnetic shield layer and lower magnetic shield layer. Accordingly, it can be said that any consideration is not taken on reduction of electrostatic capacity. In addition, the four patent documents of the related arts do not refer to an etching damage generated at a junction edge by the etching process to form the sensor height direction.

BRIEF SUMMARY OF THE INVENTION

Embodiments in accordance with the present invention reduce the influence of etching damage at junction edge of a magnetoresistive film in the sensor height direction, lower the deterioration of dielectric breakdown voltage between an upper magnetic shield layer and a lower magnetic shield layer and instability of reproducing property resulting from shield process, and maintain electrostatic capacity to a small value in a CPP magnetoresistive head. In the magnetoresistive head of the embodiment of the present invention shown in FIG. 1A, the length in the sensor height direction of bottom surface of a pinning layer 13 is longer than the length in the sensor height direction of bottom surface of a first ferromagnetic layer 14, the angle formed by an edge in the sensor height direction of the pinning layer 13 to the surface extended from bottom surface of a magnetoresistive film is smaller than the angle formed by an edge in the sensor height direction of a second ferromagnetic layer 16 to the surface extended from bottom surface of the magnetoresistive film, and the height of top surface of a sensor height direction refill film 18 is equal to or higher than the top surface of the magnetoresistive film.

For a more complete understanding of the present invention, reference is made to the following detailed description taken in conjunction with the accompanying drawings.

BRIEF DESCRIPTION OF THE DRAWINGS

FIG. 11 is a diagram showing another phenomenon of etching damage of the PtMn antiferromagnetic film.

FIG. 12 is a diagram for explaining difference in sensor property depending on a structure of the magnetoresistive film.

DETAILED DESCRIPTION OF THE INVENTION

Figure 1:
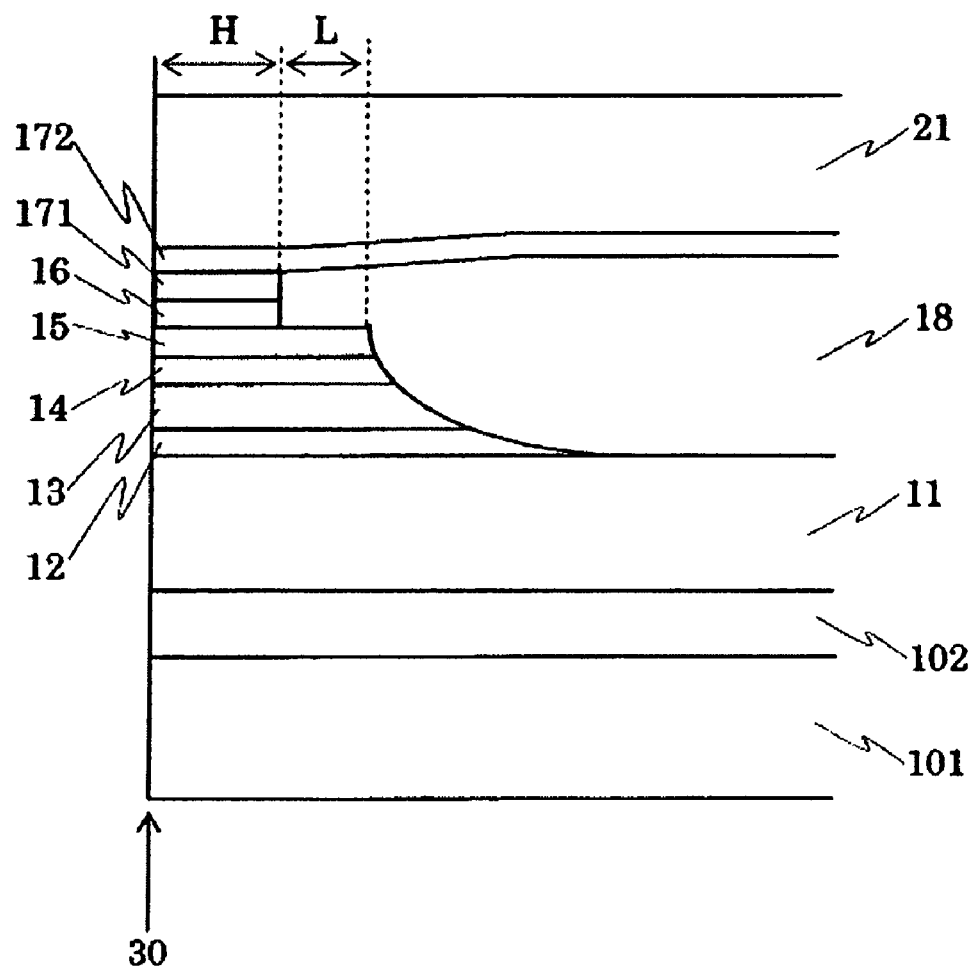
FIG. 1A is a cross-sectional structure diagram in the sensor height direction of a magnetic sensor of a CPP magnetoresistive head in accordance with an embodiment of the present invention.
FIG. 1B is a schematic diagram in the track direction of the magnetic sensor of the CPP magnetoresistive head in accordance with an embodiment of the present invention.
Figure 1:
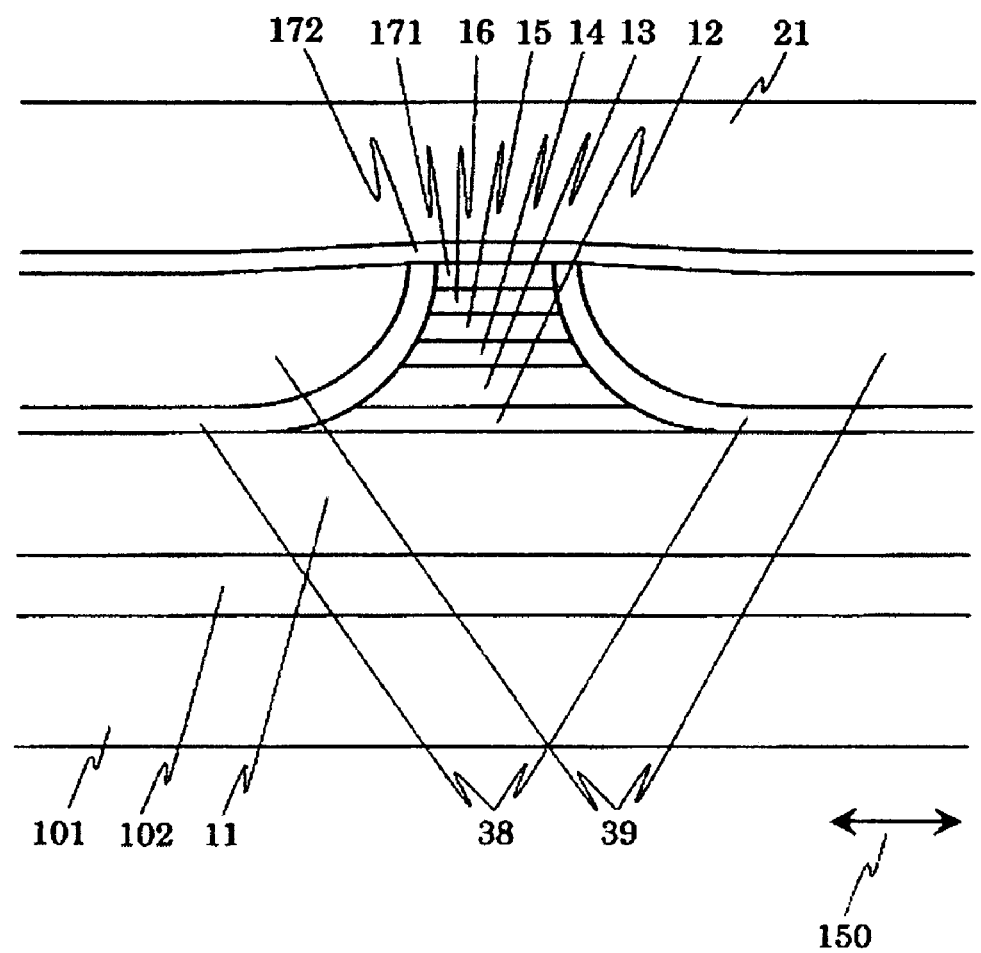

Embodiments in accordance with the present invention relate to a magnetoresistive head of the CPP (Current Perpendicular to the Plane) structure for allowing a sensing current to flow through the stacking surfaces of magnetoresistive films.

An object of an embodiment of the present invention is to provide a magnetoresistive head and a manufacturing method of the same magnetoresistive head showing stable reproducing property and excellent high frequency property by suppressing or eliminating etching damage at a junction edge of the magnetoresistive film generated when the sensor height of the CPP head is formed, moreover by suppressing deterioration in dielectric breakdown voltage between the upper magnetic shield layer and lower magnetic shield layer, which is caused by removing re-depositions on the junction edge, and by suppressing instability of reproducing performance resulting from magnetic shield layers and moreover by suppressing excessive increase in the electrostatic capacity.

The object explained above can be achieved with a magnetoresistive head, including a lower magnetic shield layer, a magnetoresistive film having a pinning layer, a first ferromagnetic layer, an intermediate layer, and a second ferromagnetic layer formed on the lower magnetic shield layer, a sensor height direction refill film allocated in the sensor height direction of the magnetoresistive film, and an upper shield layer formed on said magnetoresistive film and said sensor height direction refill film, where a sensing current is applied to the interface between the first ferromagnetic layer and the intermediate layer and to the interface between the intermediate layer and the second ferromagnetic layer, wherein a length of sensor height direction at bottom surface of the pinning layer is longer than the length of sensor height direction at bottom surface of the first ferromagnetic layer, an angle formed by an edge of the pinning layer in the sensor height direction for the surface extended from bottom surface of the magnetoresistive film is smaller than the angle formed by an edge of the second ferromagnetic layer in the sensor height direction for the surface extended from the bottom surface of the magnetoresistive film, and a height of top surface of the sensor height direction refill film is equal to or higher than top surface of the magnetoresistive film.

Here, an angle formed by an edge in the sensor height direction of the first ferromagnetic layer for the surface extended from bottom surface of the magnetoresistive film may be smaller than the angle formed by the edge in the sensor height direction of the second ferromagnetic layer for the surface extended from bottom surface of the magnetoresistive film and may be larger the angle formed by the edge in the sensor height direction of the pinning layer for the surface extended from bottom surface of the magnetoresistive film.

Moreover, the magnetoresistive head, which is freed in maximum from any etching damage, can also be provided by forming a discontinuous junction edge in the sensor height direction between top surface of the second ferromagnetic layer and bottom surface of the intermediate layer, typically just at the interface between the second ferromagnetic layer and the intermediate layer. In addition, etching damage can also be suppressed even by forming a discontinuous junction edge in the sensor height direction between top surface of the intermediate layer and bottom surface of the first ferromagnetic layer, typically just at the interface between the intermediate layer and the first ferromagnetic layer.

Further, it becomes difficult to receive influence of etching damage by forming the first ferromagnetic layer as a multi-layered structure where at least two or more ferromagnetic layers are stacked via non-magnetic metallic spacers, and setting that an average taper angle on the sensor height edge of a ferromagnetic layer, which is in contact with the pinning layer and composed of the first ferromagnetic layer, against the surface extended from bottom surface of the magnetoresistive film is smaller than an average angle formed by the second ferromagnetic layer edge for the surface extended from bottom surface of the magnetoresistive film and is larger than an average angle formed by the pinning layer edge for the surface extended from bottom surface of the magnetoresistive film.

According to an embodiment of the present invention, the magnetoresistive head, showing less deterioration in reproducing property, providing higher output and excellent stability, and assuring excellent high frequency property can be realized, because influence of etching damage at a junction edge of the magnetoresistive film in the sensor height direction can be reduced and suppressed, moreover deterioration in dielectric breakdown voltage between the upper magnetic shield layer and lower magnetic shield layer and instability of reproducing property resulting from magnetic shield layers can also be suppressed, and electrostatic capacity can also be kept small.

A profile in an embodiment of the present invention will be explained below with reference to the accompanying drawings.

In a magnetoresistive head, a magnetic sensor region for generating an electric signal in response to an external magnetic field is formed by processing a magnetoresistive film into the predetermined size and shape with the etching process. Moreover, the magnetic sensor is often required to show linear response and directions for magnetization of a first ferromagnetic layer and a second ferromagnetic layer have often been set in almost orthogonal in order to achieve such requirement. In addition, as a means for realizing such setting, the first ferromagnetic layer and a pinning layer stacked thereon are magnetically coupled. As explained above, since the pinning layer plays a very important role in the magnetoresistive head, deterioration by etching process gives a very large influence on head property. Therefore, damage by the etching process on the pinning layer has been searched.

Figure 10:
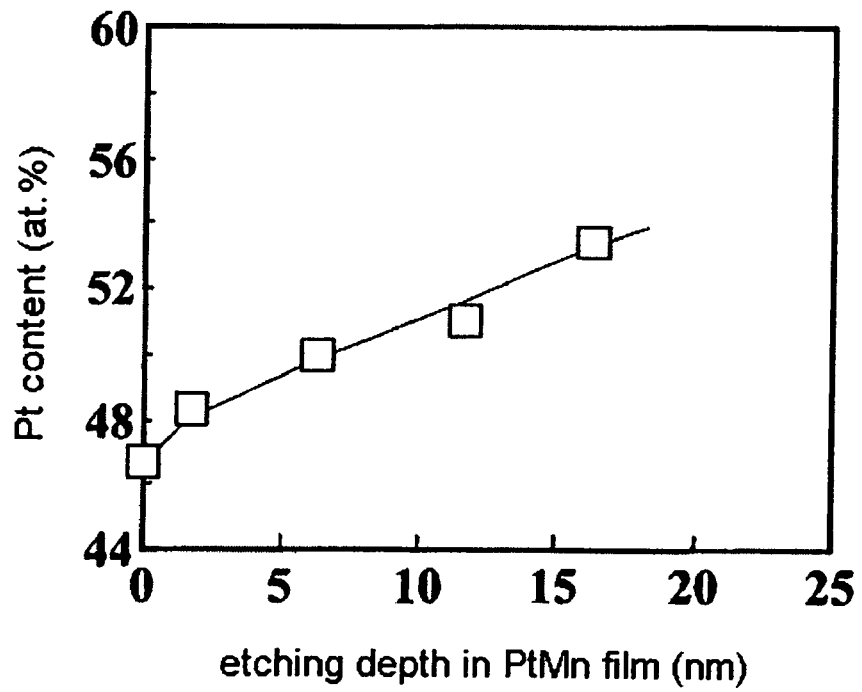
FIG. 10 is a diagram showing a phenomenon of etching damage of a PtMn antiferromagnetic film.
Figure 1:
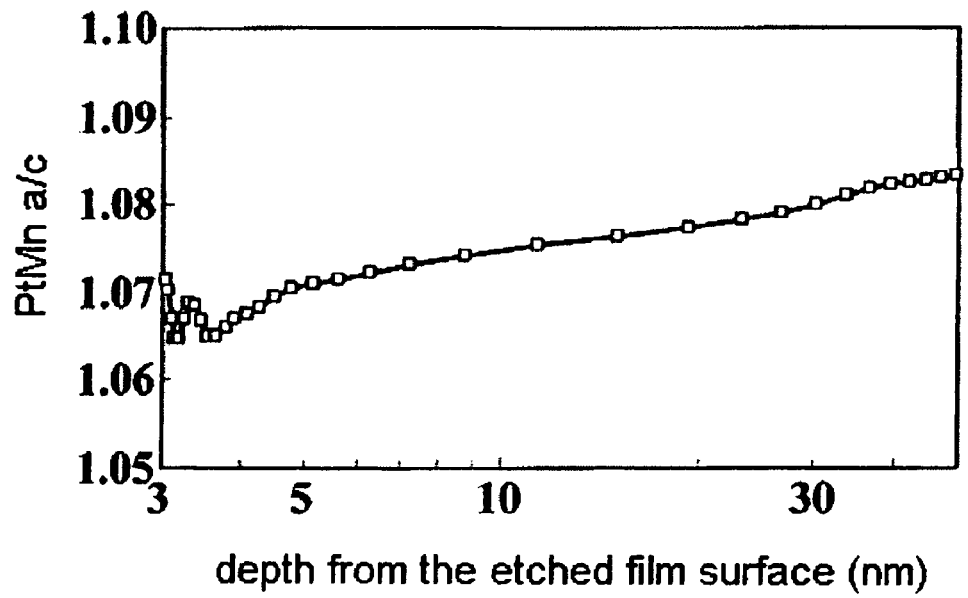
Figure 1:
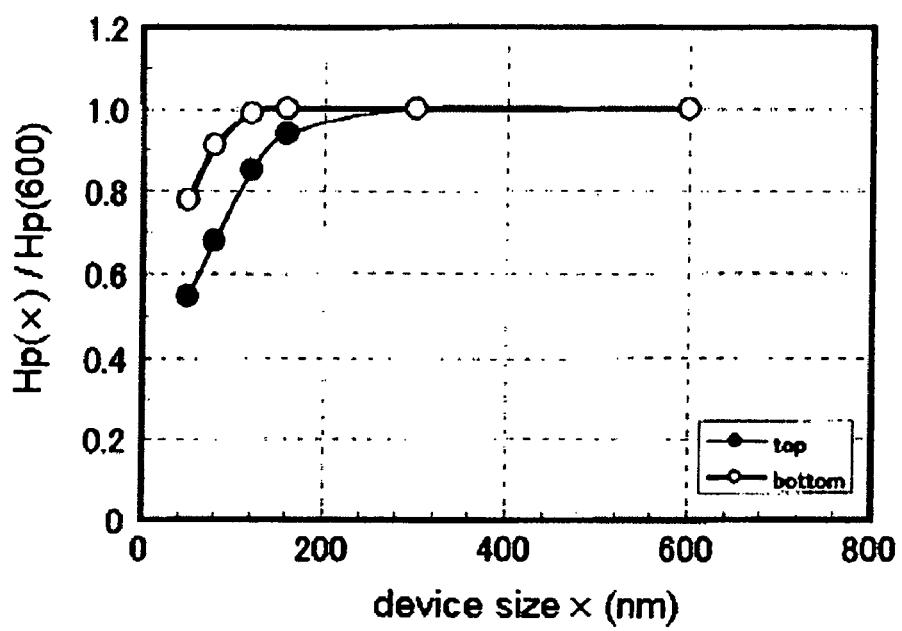

Results of experiment, where the PtMn antiferromagnetic film is used as a material of the pinning layer, as an example, and the ion milling method is used as the etching method, are shown below. FIG. 10 shows the results of search by the fluorescent X-ray analysis method for change in composition of the PtMn film in the thickness of 25 nm when etching depth in the etching process is changed. The vertical axis indicates Pt content and an incident angle of ion beam is 1° for the normal of sample surface and acceleration voltage of ion beam is 425V, as the etching conditions. The PtMn antiferromagnet shows, when it is etched, that amount of Pt increases because Mn is preferentially etched. Resultant change in property is drop of exchange coupling field with a ferromagnet. Even in the case of composition of PtMn which assures the maximum exchange coupling field before the etching process, when Pt increases in two (2) atomic percent (at. %) after the etching of about 3 nm, the exchange coupling field is lowered up to 75% of the maximum value. Moreover, when Pt increases in five (5) atomic percent (at. %) after the etching of about 10 nm, the exchange coupling field is deteriorated up to 25% of the maximum value. Here, the composition is expressed by the values measured with the fluorescent X-ray analysis method and therefore the composition values are averaged in the thickness direction thereof. Actually, Pt content increases, namely it is assumed that deterioration in the exchange coupling field becomes distinctive as it goes to the region near the etched surface.

Since the phenomenon where composition changes depending on the etching process is resulting from difference in sputtering yield depending on elements, it is not peculiar to the PtMn antiferromagnetic film and it generally occurs in a material including two ore more kinds of element. Moreover, it occurs not only in the antiferromagnetic film but also in hard magnetic film, for example, such as CoPt system alloy and CoCrPt system alloy.

In FIG. 11, lattice constant of PtMn in the depth direction of the etched film surface is obtained and the lattice constant ratio a/c is plotted for depth direction from the etched film surface, for the sample of PtMn film in the thickness of 25 nm before the etching which has been etched under the conditions that an incident angle of ion beam is 1° for the normal of the sample surface and acceleration voltage of ion beam is 425V. In view of raising accuracy of experiment, synchrotron radiation is used as the X-ray source. Moreover, for the lattice constant ratio of vertical axis a/c, since the antiferromagnet in the PtMn has the body-centered tetragonal lattice and the paramagnet has the face-centered cubic lattice, the antiferromagnet having a larger a/c value shows more excellent property. From the viewpoint explained above, it may be thought from FIG. 11 that the a/c value becomes smaller at the region near the etched surface, showing deteriorated property of the antiferromagnet.

A cause of reduction in the a/c value due to the etching process may be assumed to exist in the process that the elements having formed the ordered body-centered tetragonal lattice have driven with the ion beam having kinetic energy to form the disordered face-centered cubic lattice. As explained above, it can be understood that crystal structure changes due to the etching and thereby such change result in deterioration in the property. A result of the PtMn antiferromagnet has been explained as an example but the similar phenomenon is also generated in the Mn—Ir system alloy which is thought to improve the antiferromagnetic property thereof with the ordered lattice such as $Mn_3Ir$ and an alloy showing antiferromagnetic property including the other ordered lattice. Moreover, in the hard magnetic film such as CoPt system alloy and CoCrPt system alloy, hexagonal lattice has mainly been observed before the etching process but a portion of the face-centered cubic lattice increases after the etching process, showing deterioration in the hard magnetic property.

The ion milling method has been considered as an example here but the similar phenomenon will be generated even in the reactive ion beam etching. In the case of a magnet, since a reaction product of lower sublimation temperature cannot be obtained, the physical etching should be considered mainly rather than the chemical etching even when the reactive ion beam etching has been conducted. Namely, the etching mechanism like the ion milling is basically utilized.

Next, a so-called bottom-type spin-valve film where the antiferromagnetic film is located at the region nearer the substrate side and a so-called top-type spin-valve film where the antiferromagnetic film is located at the region far from the substrate are formed on a lower electrode formed of Ni—Fe system alloy film in the thickness of 1 μm, and the CPP sensors having various sizes have been manufactured with the same processes for comparison of properties. The square CPP sensors having the side of 600, 300, 160, 120, 80, and 50 nm have been manufactured using the PtMn antiferromagnetic film in the thickness of 15 nm as the pinning layer and the $Co_{75}Fe_{25}$ film in the thickness of 3 nm as the first ferromagnetic layer stacked thereon. Here, the etching has been conducted for the time equal to 1.25 times the time of etching with the incident angle of 10° by setting the ion beam incident angle to 70° in order to remove re-deposition adhered to the junction side wall after conducting the first etching with the ion beam incident angle of 10° to the normal of the etched film surface.

FIG. 12 is a diagram showing dependence on device size of exchange coupling field $H_p$ between the pinning layer and the first ferromagnetic film. Here, the vertical axis indicates the values normalized with the value of $H_p$ of the device having a size of 600 nm. Comparison between the bottom-type and the top-type suggests that the bottom-type has the small device size from which $H_p$ starts to become small, while the normalized $H_p$ value also becomes large. Therefore, it may be understood that deterioration of $H_p$ in the bottom-type is rather small.

Figure 13:
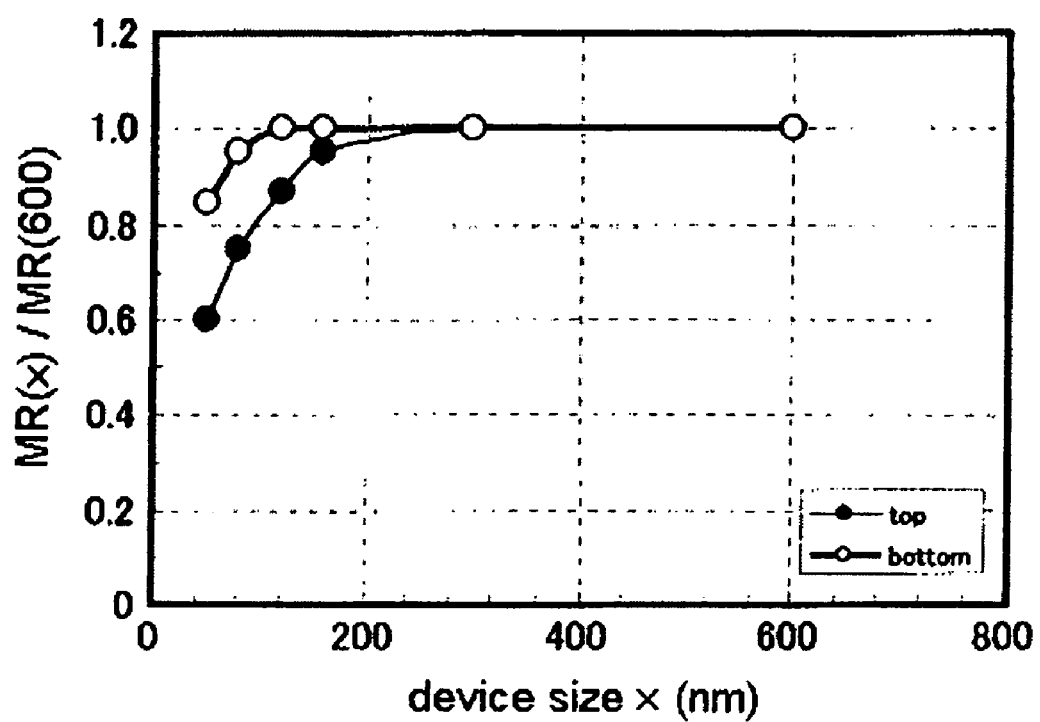
FIG. 13 is a diagram for explaining difference in another sensor property depending on a structure of the magnetoresistive film.

FIG. 13 is a diagram showing dependence on device size of the MR ratio of the CPP sensor measured under the conditions that the voltage is 20 mV and the maximum applied magnetic field is 3 kOe. Like FIG. 12, the values are normalized with the value of the MR ratio of the device having a side of 600 nm. In regard to the MR ratio, the device size from which the MR ratio starts to be lowered in the bottom-type is smaller than that of the top-type and the normalized MR is larger. As a cause of reduction in the MR ratio, influence of deterioration of $H_p$ may be considered larger.

Large difference in structures of the bottom-type and top-type is that whether the pinning layer is provided near the substrate or far from the substrate and thereby difference in the ion irradiation times to the pinning layer during etching process is also generated. In the bottom-type, ion is not irradiated from the initial stage of etching to removal of the first ferromagnetic layer because the pinning layer is provided near the substrate. However, in the case of top-type, ion irradiation is continued almost to the entire part of etching time. This difference appears as difference in change of composition and structure of the pinning layer as is explained using FIG. 10 and FIG. 11 and thereby it is considered that difference has been generated in the properties of $H_p$ and MR ratio.

From the results explained above, it may be understood that it is rather preferable to use the bottom-type magnetoresistive film in order to control etching damage.

The preferred embodiments of the present invention will be explained with reference to the accompanying drawings.

First Embodiment

FIG. 1A shows a cross-sectional structure in the sensor height direction of a magnetic sensor of a magnetoresistive head of the present invention. For the reference, FIG. 1B shows structures in the track direction at the air bearing surface. Moreover, FIGS. 14(A)-(E) are schematic diagrams showing the processes to form the sensor height direction.

Figure 14A:
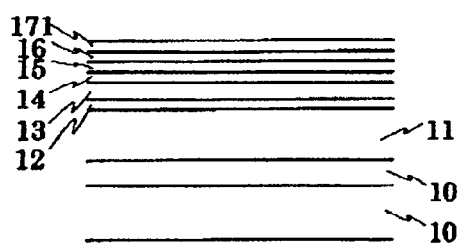
FIGS. 14(A)-(E) are schematic diagrams of a manufacturing method of the CCP magnetoresistive head in accordance with an embodiment of the present invention.

As shown in FIG. 14(A), a substrate 101 formed of a ceramic including alumina and titanium carbide is covered with an insulator film 102 such as alumina, the surface thereof is subjected to planarization with fine polishing. Thereafter, a lower magnetic shield layer 11 formed of Ni—Fe system alloy is formed. In this process, a film formed, for example, by the sputtering method, ion beam sputtering method or plating method is patterned into the predetermined shape, thereafter an insulator film of alumina is formed to the entire surface of the substrate, and the surface is subjected to the planarization with the chemical mechanical polishing (CMP) method so that the surface is almost in the height equal to that of the insulator film provided in the periphery thereof. In this case, surface roughness of the lower magnetic shield layer 11 is controlled to become lesser than the predetermined roughness.

After an surface oxide layer or the like thereon is cleaned within a deposition apparatus, a lower gap layer 12, a pinning layer 13, a first ferromagnetic layer 14, an intermediate layer 15, a second ferromagnetic layer 16, and a first upper gap layer 171 are stacked in this sequence from the substrate side to form a magnetoresistive film to form a sensor region.

Here, as the lower gap layer 12 and the first gap layer 171, Ta, Ru, Ni—Cr—Fe system alloy or stacked film of these elements is used. As the pinning layer 13, an antiferromagnetic film such as Pt—Mn system alloy and Mn—Ir system alloy and hard magnetic films such as Co—Pt system alloy and Co—Cr—Pt system alloy are used. Moreover, as the first ferromagnetic layer 14 and second ferromagnetic layer 16, Ni—Fe system alloy, Co—Fe system alloy, Co—Ni—Fe system alloy and high polarization materials such as magnetite, Heusler alloy and stacked film of these can be used. Moreover, a multi-layered film stacking ferromagnetic layers via a spacer of 10 Å or less may also be used. The intermediate layer 15 is a tunneling barrier when the TMR effect is used. In more concrete, it is an oxide including at least one element such as Al, Mg, Si, Zr, and Ti, or a composite oxide of these elements, or a stack of these oxides. Moreover, it is a conductive layer or a conductive layer including confined-current-path when the CPP-GMR effect is used. In more concrete, Al, Cu, Ag, Au, or mixtures of these elements and a stacked body of these elements, moreover, a layer for current confinement through partial oxidation and nitridation of a part of these elements may be inserted.

After formation of the lower gap layer, magnetoresistive film, and first upper gap layer as explained above, the annealing or magnetizing in the magnetic field for setting the magnetization of the first ferromagnetic layer 14 to a particular direction is performed. Particularly, when the pinning layer 13 is formed of an antiferromagnetic material having the ordered lattice, for example, Pt—Mn system alloy or Mn—Ir system alloy, an ordered structure is constituted and the annealing in the magnetic field is required until exchange coupling with the first ferromagnetic layer is generated.

Figure 14B:
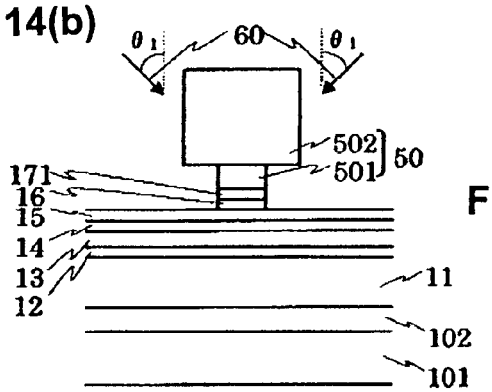
Figure 14C:
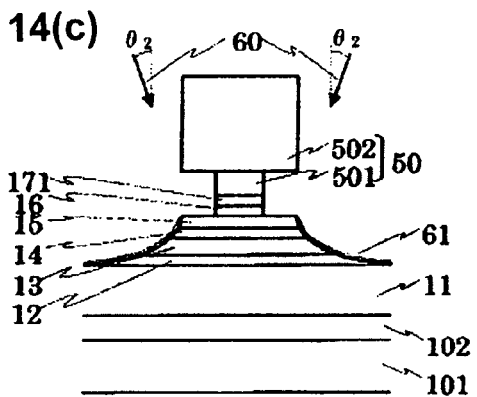
Figure 14D:
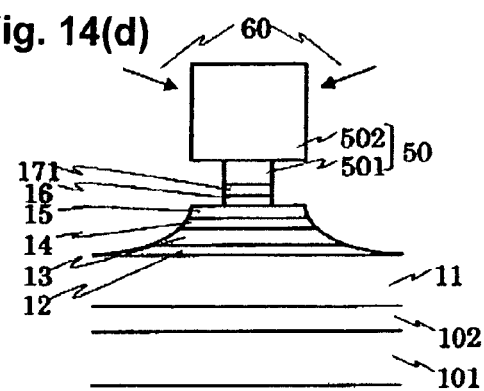

Next, as shown in FIG. 14(B), a lift-off mask 50 is formed to a region which becomes a sensing region in the sensor height direction and the magnetoresistive film of the unwanted region is removed with the etching process. In this case, a first etching is conducted in the incident angle $\theta_1$ from 20 to 45° until the second ferromagnetic layer 16 is etched using a bi-layer resist formed of an under-layer resist 510 which is short in the length of the sensor height direction and an upper-layer resist 502 which is longer in the sensor height direction. The arrow mark 60 indicates the incident direction of atoms to etch. Thereafter, as shown in FIG. 14(C), a second etching is conducted until the lower gap layer 12 in the incident angle $\theta_2$ which is smaller than that in the first etching. Moreover, as shown in FIG. 14(D), a third etching is conducted for removing re-deposition 61 adhered to the side wall in the sensor height direction in the incident angle larger than that in the second etching.

With the etchings explained above, length in the sensor height direction of the magnetic sensor is specified with the second ferromagnetic layer 16. In the side of substrate more than the intermediate layer, length in the sensor height direction of bottom surface of the pinning layer is longer than the length in the sensor height direction of bottom surface of the first ferromagnetic layer and an average angle formed by an edge of the pinning layer to the surface extended from bottom surface of the lower gap layer 12 (for example, angle measured at the intermediate position in the film thickness direction of the pinning layer) is smaller than the average angle formed by an edge of the second ferromagnetic layer to the surface extended from bottom surface of the lower gap layer 12. In this shape, the region damaged with ion irradiation in the etching process includes a gradual taper and therefore the region just under the first ferromagnetic layer does not include a taper at the edge in the sensor height direction and such region relatively becomes small in comparison with that in the case where the pinning layer and the first ferromagnetic layer are almost equal in the sensor height direction. Accordingly, it may be said that this structure is rather durable to etching damage.

Figure 14E:
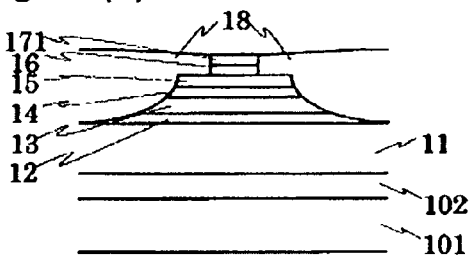

Next, as shown in FIG. 14(E), a sensor height direction refill film 18 is formed, for example, with the sputtering method, ion beam sputtering method or chemical vapor deposition (CVD) method. As explained above, forming a taper on the sensor height edge of the substrate side of the magnetoresistive film can prevent the generation of a step on the surface of the sensor height direction refill film 18 which is deposited after the sensor height etching process. As the sensor height direction refill film 18, a single-layered film, a composite film, and a stacked film such as alumina, silicon oxide, tantalum oxide, aluminum nitride, silicon nitride, and tantalum nitride may be used. In the case of the stacked film, a metallic film may be used in the top layer near the upper magnetic shield layer by allocating the oxide film and nitride film explained above as the bottom layer. However, in this case, it is preferable that film thickness of at least the bottom layer of the oxide or nitride film is thicker than that of the top layer of the metallic film from the point of view of reducing electrostatic capacity formed by the lower magnetic shield layer and upper magnetic shield layer. After formation of the sensor height direction refill film 18 with the method explained above, the lift off mask is removed. Thereafter, a second upper gap layer 172 is formed if necessary in order to form an upper magnetic shield layer 21.

Figure 15A:
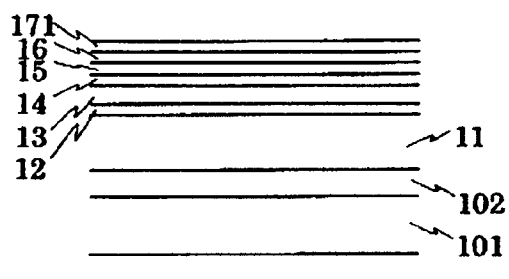
FIGS. 15(A)-(E) are schematic diagrams of another manufacturing method of the CPP magnetoresistive head in accordance with an embodiment of the present invention.
Figure 15B:
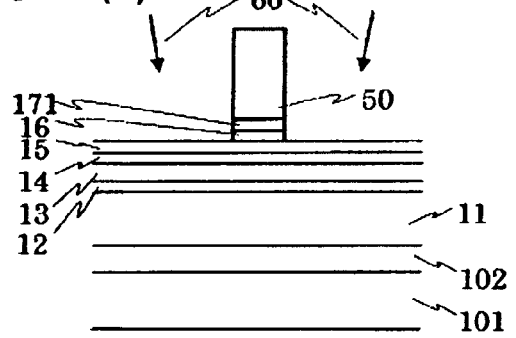
Figure 15C:
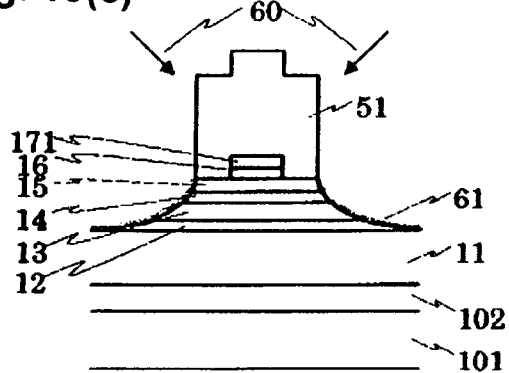
Figure 15D:
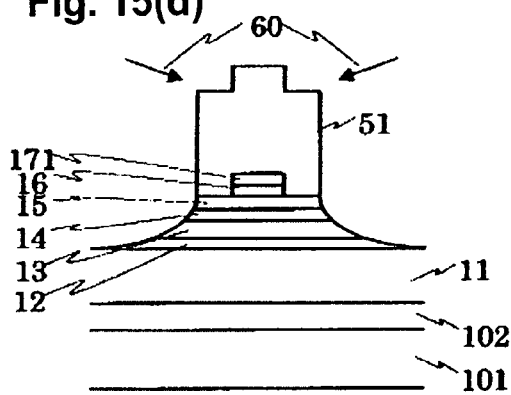
Figure 15E:
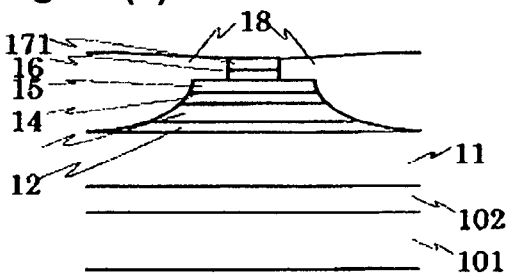

FIGS. 15(A)-(E) are schematic process diagrams showing another manufacturing method of magnetoresistive head of the CCP structure of the present invention. FIGS. 15(A) and 15(E) correspond to FIGS. 14(A) and 14(E). In the manufacturing process of FIG. 14(A)-(E), an example has been explained, wherein a bi-layer mask is used as the lift off mask in the sensor height direction. But, it is also possible, as shown in FIG. 15(B), that the mask 50 is removed after etching up to the second ferromagnetic layer 16, and thereafter a mask 51 for etching up to the lower gap layer 12 is formed as shown in FIG. 15(C). The incident angle of etching atoms in this etching process is preferably set to from 0 to 30° in FIG. 15(B) and from 10 to 45° in FIG. 15(C).

In FIG. 1A, the length H in the sensor height direction which is the height of the second ferromagnetic layer 16 and first upper gap layer 171 and the length in the sensor height direction of the layers lower than the intermediate layer 15 under the second ferromagnetic layer 16 will be considered. Sensor height H is a parameter which gives influence on sensitivity of the second ferromagnetic layer 16 for external magnetic field and is also a design parameter which can be determined with a track width because it gives influence on stability of reproducing property. Meanwhile, longer length (H+L) is more desirable in the sensor height direction because the first ferromagnetic layer 14 is required to have excellent thermal stability. However, when the length H+L of the first ferromagnetic material 14 becomes longer, the height difference L between the intermediate layer 15 and the second ferromagnetic layer 16 becomes longer. Therefore, the region where the sensor height direction refill film 18 becomes thinner becomes also longer, resulting in deterioration in high frequency response. Accordingly, the value L is a parameter determined by the specification of data transfer rate of the magnetic storage apparatus.

Shortest length of the parameter L depends on the manufacturing method. In the manufacturing method shown in FIGS. 14(A)-(E), after coating and exposure of the bi-layer resist consisting of the lower layer resist 510 and the upper layer resist 502, only the lower layer resist 501 is recessed with the wet process or dry process and thereby it becomes shorter than the upper layer resist 502. In this case, however, the shortest length L is determined as about 20 nm with the etching accuracy of the lower layer resist 501. Meanwhile, in the manufacturing method shown in FIGS. 15(A)-(E), the shortest length L is determined to about 9 nm with the position accuracy of the lift off mask 50 and the second lift off mask 51.

Moreover, etching of the magnetoresistive film can be conducted with the ion beam etching method, and reactive ion beam etching method. In this method, the method for changing the etching condition just after the second ferromagnetic layer 16 is removed may be the controlling of etching based on the etching rate of each layer. Higher accurate control can also be realized by monitoring the etched elements with the secondary ion mass spectroscopy or plasma emission spectroscopy during the etching process.

After completion of formation in the sensor height direction, the lift off mask is formed in the region which becomes the sensing region for the track width direction and the magnetoresistive film of the region other than the sensing region for detecting a magnetic field is removed by the etching process. In this case, it is very important to minimize amount of re-deposition left on the edge of the magnetoresistive film as in the case of the sensor height direction. Thereafter, the insulator film formed of a single-layered film, composite film or stacked film such as alumina, silicon oxide, tantalum oxide, aluminum nitride, silicon nitride, and tantalum nitride is formed and moreover a hard magnetic film for applying longitudinal biasing magnetic field to the second ferromagnetic layer 16 is formed thereon. Processing in the track width direction is completed by removing the lift off mask. In this case, an underlayer film may also be provided for controlling property, particularly coercivity of the hard magnetic film. Moreover, it is also possible to provide a capping layer for the purpose of protection during the process.

Next, a lead is formed to supply a sensing current to the lower magnetic shield layer 11 and the upper magnetic shield layer 21. As the material of leads, a low resistive metal such as Cu, Au, Ta, Rh, Mo or the like is used and the other metallic layer may also be formed in the lower side, upper side or in both sides of such lead as required.

After formation of an insulator protective film as required, cleaning is conducted for the top surface such as magnetoresistive film and leads. Thereafter, a second upper gap layer 172 working also as the underlayer of the upper magnetic shield layer 21 and the upper magnetic shield layer 21 are formed. Thereby the processes for the read head are completed.

Figure 2:
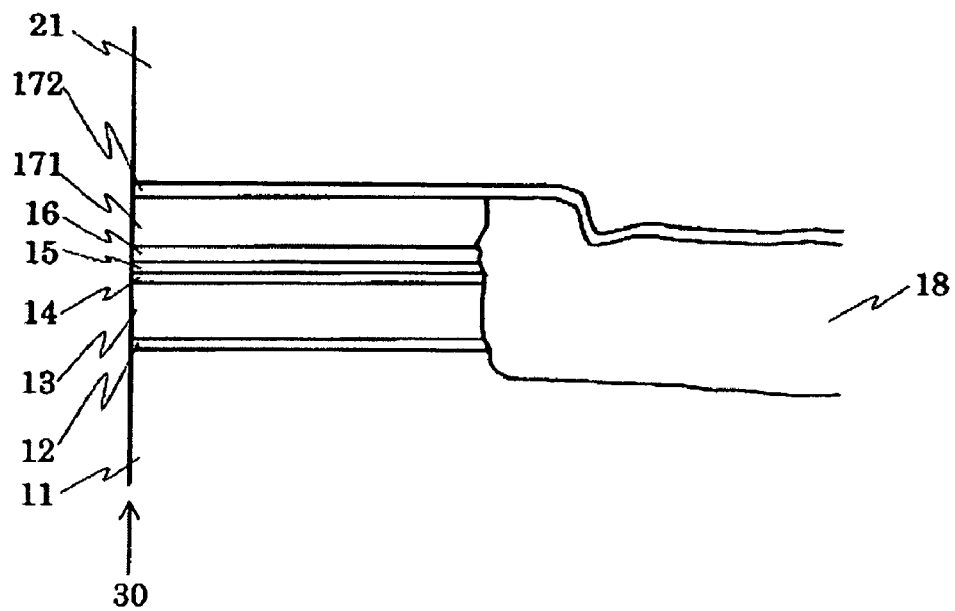
FIG. 2 is a cross-sectional schematic diagram in the sensor height direction of the magnetic sensor of the CPP magnetoresistive head of the related art.
Figure 3:
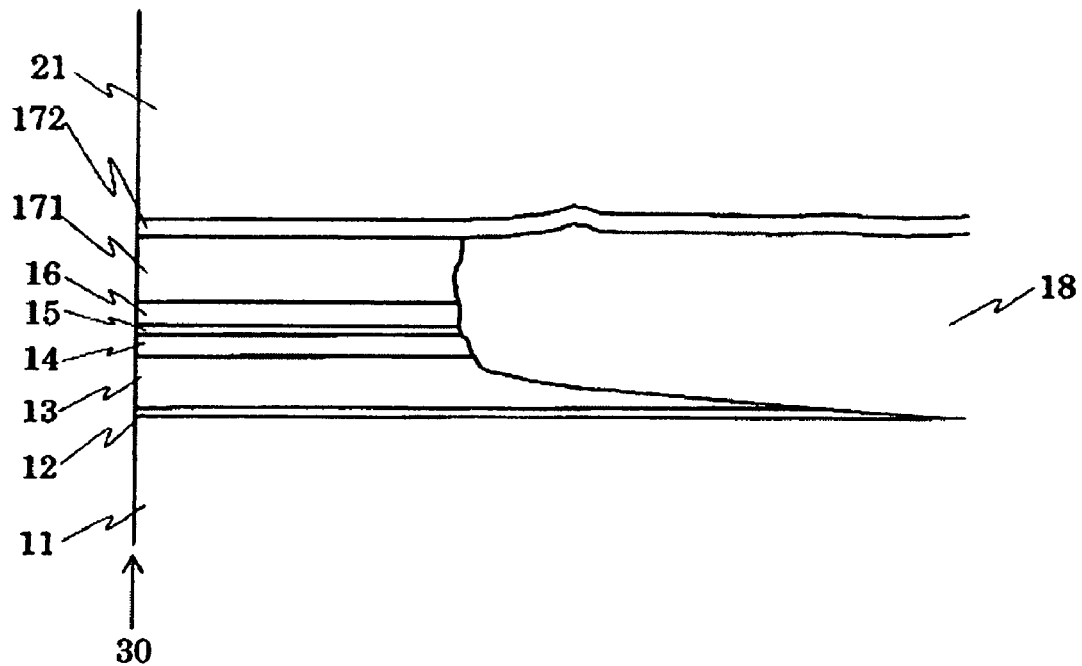
FIG. 3 is a cross-sectional schematic diagram in the sensor height direction of the magnetic sensor of the CPP magnetoresistive head in accordance with an embodiment of the present invention.

FIG. 2 is a schematic diagram of the sectional structure of the sensing region in the sensor height direction when it is etched almost perpendicularly without providing a taper in the present invention at the time of forming of the sensing region in the sensor height direction by etching the magnetoresistive film. In this case, as shown in the figure, a step occurs at the boundary between the regions where a coverage of the sensor height direction refill film 18 is bad and good because of the shadow effect by the resist mask. As a result, the step is also transferred to the upper magnetic shield layer 21. On the other hand, as shown in FIG. 3, when the taper is formed to the region where a coverage of the refill film 18 is bad because of the shadowing of the resist mask, the upper surface of the sensor height direction refill film 18 is at higher position by the formed taper. Accordingly, a step is not formed at the upper surface of the sensor height direction refill film 18. As a result, the step is no longer generated on the upper magnetic shield layer 21.

An inductive head for writing is formed thereon via an separation layer between the read head and write head. However, details of this forming process are omitted here. After formation of an inductive magnetic head, while the magnetic field of 500 Oe is applied to the read head in the track width direction, the annealing is executed for three hours at 250° C. Under the condition that the direction of magnetization of the second ferromagnetic layer 16 is kept almost in the sensor height direction, the direction of magnetization of the first ferromagnetic layer 19 is directed to the track width direction. Thereby, the wafer process is completed.

Moreover, a head gimbal assembly is completed through the slider process for lapping with mechanical lapping a magnetic head until the predetermined sensor height is obtained, a protection film deposition process for protecting the read head and write head within the magnetic storage apparatus, a process for forming the predetermined shaped rail to the air bearing surface for controlling a spacing between the magnetic head and the magnetic disk, and an assembly process for bonding individual magnetic heads to a suspension.

For comparison purpose, the reproducing property has been evaluated by also manufacturing a magnetic head where the length in the sensor height direction of the magnetoresistive film is almost equal to the length of a free layer (the second ferromagnetic layer 16) and etching is conducted in almost perpendicularly to the substrate surface without provision of taper. The magnetic head of the present invention and the magnetic head for comparison have similar structure other than the shape in the sensor height direction. Using, as the magnetoresistive film, the CPP-GMR film where a confined-current-path layer is inserted into the intermediate layer is used, distance between the upper magnetic shield layer and lower magnetic shield layer is set to 50 nm, a product $B_r t$ of residual magnetic flux density $B_r$ and film thickness t of the hard magnetic layer as the longitudinal biasing layer is 8 times the product $B_s t$ of saturate magnetic flux density $B_s$ and film thickness t of the free layer, track width is 60 nm, and sensor height is 70 nm. Table 1 shows the result of comparison by paying attention to an output $V_{pp}$ at the operating voltage of 120 mV and amplitude fluctuation $dV_{pp}$ observed by repeating ON and OFF of the write current for 1000 heads. Here, the amplitude fluctuation $dV_{pp}$ is defined as Vpp= $(V_{max}-V_{min})/V_{ave} \times 100(\%)$, when the maximum output is designated as $V_{max}$, minimum output as $V_{min}$, and average value as $V_{ave}$. In this table, the head providing the output $V_{pp}$ of 0.6 mV or higher and the amplitude fluctuation $dV_{pp}$ of 15% or less is defined as good product.

TABLE 1

|  | Good product rate in output $V_{pp}$ | Good product rate in amplitude fluctuation $dV_{pp}$ |
| --- | --- | --- |
| Heads in the present invention | 91% | 95% |
| Comparative examples (Heads of related art) | 68% | 75% |

The good product rates in output and amplitude fluctuation of the magnetic heads in the present invention are respectively 91% and 95%, but the same in the magnetic heads of the comparative examples is lowered respectively to 68% and 75%. In order to search the cause why difference is generated in the good product rate in output, the transfer curve measurement has been conducted in ±10 kOe. As a result, deterioration of exchange coupling field between the first ferromagnetic layer and the pinning layer (PtMn antiferromagnetic layer) has been observed in the comparative examples but deterioration of exchange coupling field almost cannot be observed in the heads of the present invention Amplitude fluctuation is assumed to be generated with the reason (i) the longitudinal biasing field working on the second ferromagnetic layer 16 from the longitudinal biasing layers 39 provided in both sides of the second ferromagnetic layer 16 via the track direction refill film 38 is smaller than the predetermined value in FIG. 1B which is the diagram along the track direction or the reason (ii) magnetization of the second ferromagnetic layer 16 becomes instable because the domain wall is generated on the lower magnetic shield layer 11 or in the upper magnetic shield layer 21 and the magnetic field which will interfere the normal operation when such domain wall moves has been applied to the second ferromagnetic layer 16. In order to separate such reasons, measurement has been conducted while the magnetic field of 30 Oe has been applied in the track width direction. When the reason (i) is adapted, effect of the longitudinal biasing field is large in the magnetic field as low as about 30 Oe and any improvement cannot be realized but when the reason (ii) is adapted, it is possible to expect suppression of amplitude fluctuation because the domain wall can be extinguished by saturating magnetization of the magnetic shield layer in the track width direction with the magnetic field of 30 Oe. As a result of experiment, the good product rate in the heads of comparative example has been recovered up to 92%.

From this result, it may be assumed, for the magnetic heads in the comparative example, that a large step exists in the upper magnetic shield layer in the sensor height direction as shown in FIG. 2 and this step causes generation of domain wall. Meanwhile, it may also be assumed for the heads of the present invention that a step does not exist so much on the upper magnetic shield layer as shown in FIG. 3 and therefore domain wall is not generated. Moreover, distances between the lower magnetic shield layer 11 and the upper magnetic shield layer 21 or sensor film (lower gap layer 12, pinning layer 13, first ferromagnetic film 14, intermediate layer 15, second ferromagnetic layer 16 and first upper gap layer 171) of the heads in the comparative example and present invention have been compared. Distance between the upper magnetic shield layer 21 and the lower magnetic shield layer 11 or sensor film is locally shortened at the corner of the step of the upper magnetic shield layer 21 in the heads of the comparative example, while the minimum distance between the upper magnetic shield layer and lower magnetic shield layer or sensor film is longer than that of the heads in the comparative example because the step is not generated in the heads of the present invention. Accordingly, electrostatic capacity C of the latter heads has been smaller than that of the former heads.

As explained above, it has been made apparent that the magnetoresistive head showing less deterioration in the reproducing property and assuring higher output, excellent stability, and excellent high frequency response can be manufactured with the present invention.

Second Embodiment

Figure 4:
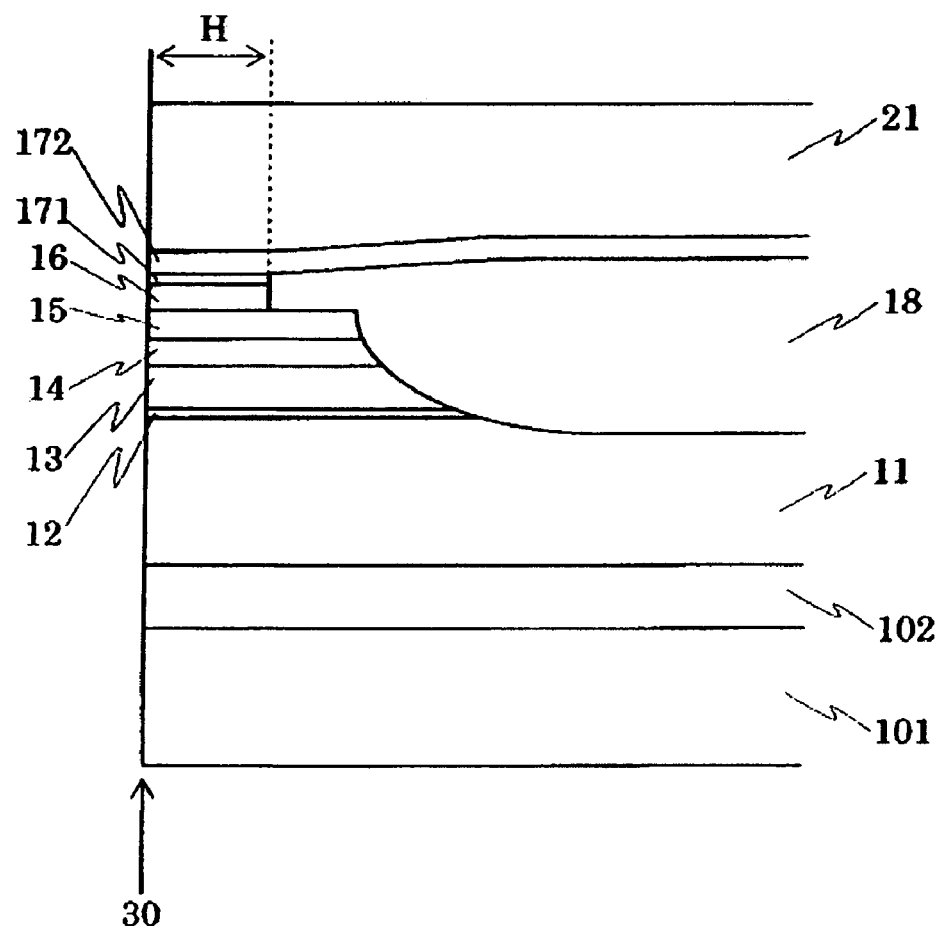
FIG. 4 is a cross-sectional structure diagram in the sensor height direction of the magnetic sensor of the CPP magnetoresistive head in accordance with an embodiment of the present invention.

In order to attain higher reproducing resolution, the distance between the lower magnetic shield layer 11 and the upper magnetic shield layer 21 must be shortened and thereby electrostatic capacity increases. A cross-sectional structure in the sensor height direction of the magnetic sensor of the magnetoresistive head of the present invention to solve the problem explained above is shown in FIG. 4.

In the first embodiment, the gradual taper at the edge in the sensor height direction of the magnetoresistive film stops at the lower gap layer 12 and the upper surface of the lower magnetic shield layer 11 is flat. Therefore, if a distance between the upper and lower magnetic shield layers is narrowed while the shape is maintained as it is, the electrostatic capacity increases. Accordingly, in this embodiment, increase in the electrostatic capacity is suppressed by widening the distance between the upper and lower magnetic shield layers at higher position along the sensor height direction in the opposite side of the air bearing surface through the etching of the lower magnetic shield layer 11 while the gradual taper stopping at the lower gap layer 12 is maintained as it is. Namely, in the magnetoresistive head of this embodiment, the distance between the lower magnetic shield layer 11 and the upper magnetic shield layer 21 at the higher position along the sensor height direction of the magnetoresistive film is larger than the distance between the lower magnetic shield layer 11 and the upper magnetic shield layer 21 at the air bearing surface.

Third Embodiment

In order to attain higher track density, side reading in the track direction must be reduced. As a means for realizing this purpose, a method has been proposed, in which the side shield is allocated in both sides of the magnetic sensor in the track direction. In this case, it is desirable to introduce the so-called in-stack biasing structure wherein a longitudinal biasing layer is stacked in the upper or lower side of the magnetoresistive film.

Figure 5:
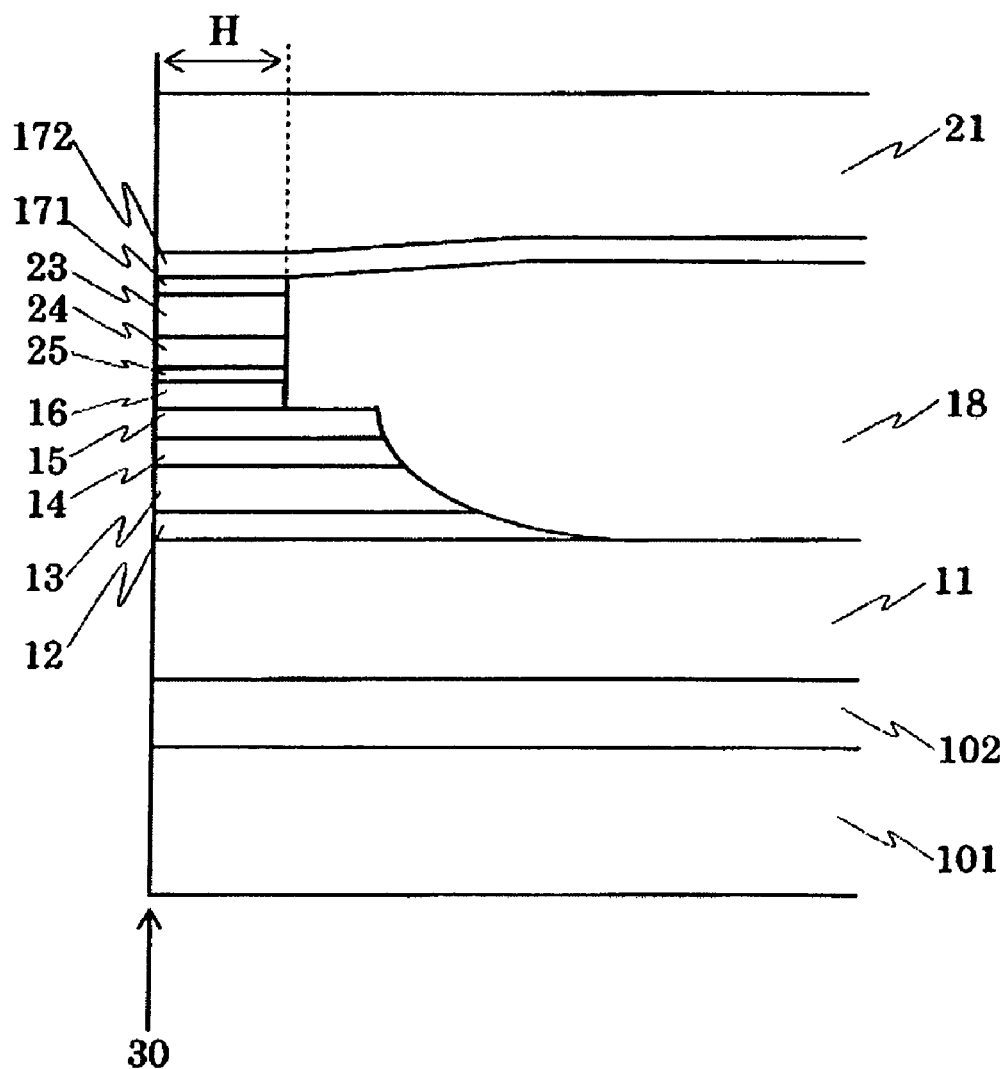
FIG. 5 is a cross-sectional structure diagram in the sensor height direction of the magnetic sensor of the CCP magnetoresistive head in accordance with an embodiment of the present invention.

FIG. 5 shows a cross-sectional structure in the sensor height direction of the magnetic sensor of the magnetoresistive head of an embodiment of the present invention which is suitable for the in-stack biasing structure. In the basic in-stack biasing structure, a first pinning layer for pinning magnetization of the first ferromagnetic layer and a second pinning layer for pinning, in the track direction, magnetization of the longitudinal biasing layer 24 provided to applying the longitudinal biasing field to the second ferromagnetic layer are necessary, but the former requires larger value of the exchange coupling field. Therefore, in this embodiment, the first pinning layer 13 is allocated to the side of the substrate where less deterioration by the etching is expected, and the second pinning layer 23 assuring wider margin in deterioration by the etching is allocated to the region far from the substrate.

In the in-stack biasing structure, a layer for controlling coupling fields 25 may also provided for controlling amplitude and direction of exchange coupling and magnetostatic coupling between the second ferromagnetic layer 16 and the longitudinal biasing layer 24.

Fourth Embodiment

Figure 6:
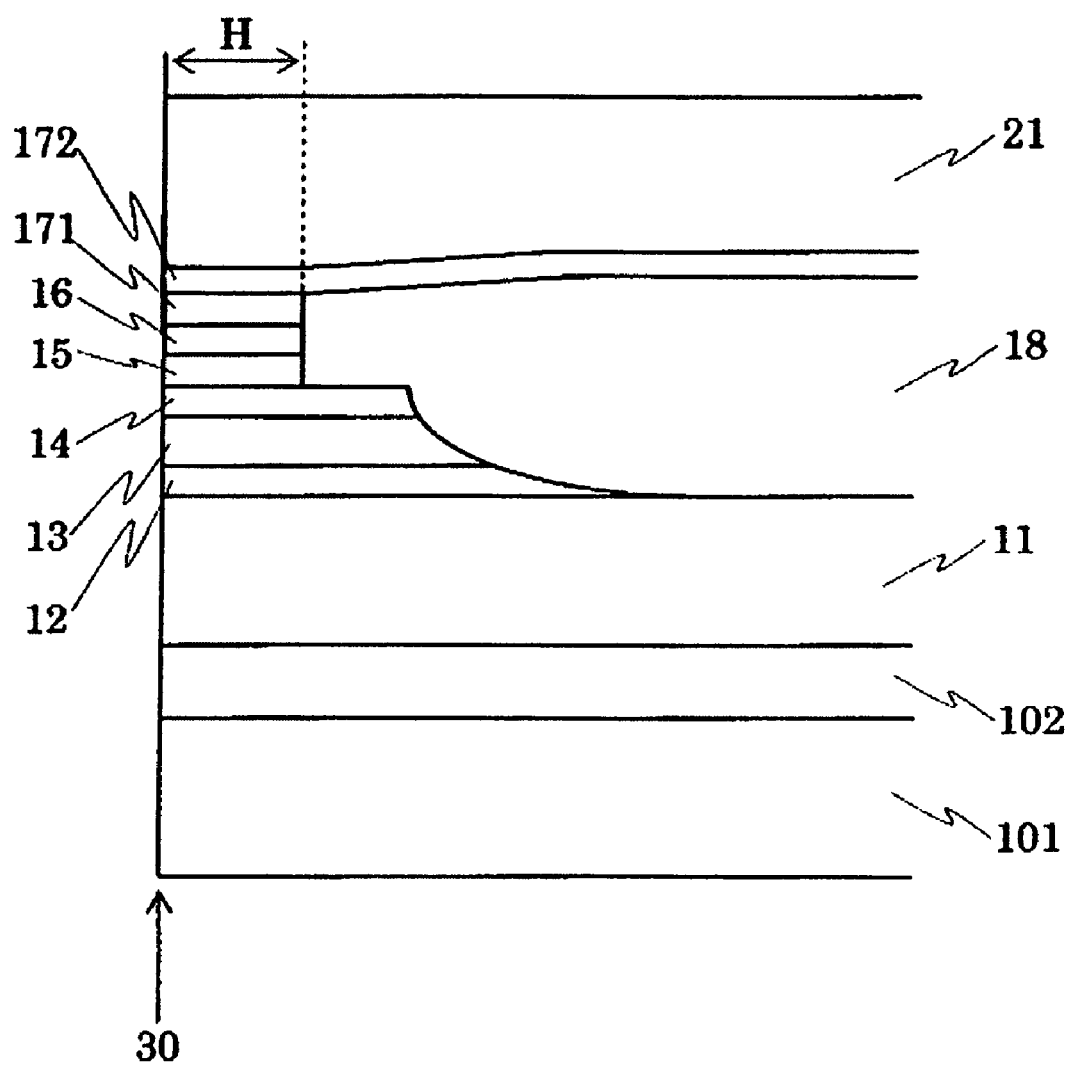
FIG. 6 is a cross-sectional structure diagram in the sensor height direction of the magnetic sensor of the CPP magnetoresistive head in accordance with an embodiment of the present invention.

FIG. 6 shows a cross-sectional structure in the sensor height direction of the magnetic sensor of another magnetoresistive head of the present invention. The manufacturing method for the region other than the magnetoresistive film in the sensor height direction is similar to that of the first embodiment. Therefore, only the structure in the sensor height direction will be explained.

In the first embodiment, the structure is provided, wherein the region influenced by etching damage exists only in the edge of the first ferromagnetic layer 14 because the first etching is stopped when the second ferromagnetic layer 16 of the region other than the sensing region is etched. When etching rate of the intermediate layer 15 is lower than that of the second ferromagnetic layer 16, for example, in the case of the tunneling barrier used for the tunneling magnetoresistive film, such structure may be realized rather easily. However, when such etching rates are equal or when the etching rate of the intermediate layer 15 is rather high, manufacture with good reproducibility becomes difficult.

In above case, the first etching is stopped when the intermediate layer 15 is etched and the second etching is started from the first ferromagnetic layer 14 as show in FIG. 6. In this case, length in the sensor height direction of top surface of the first ferromagnetic layer 14 is longer than the length in the sensor height direction of the interface of both intermediate layer 15 and the first ferromagnetic layer 14 and these two layers are formed non-continuously at the edge in the sensor height direction. In this structure, deterioration in magnetic property may be generated at the region near the film surface, even when physical film thickness is not changed, in the region other than the interface between the first ferromagnetic layer 14 and the intermediate layer 15, but it is assumed that any deterioration in the exchange coupling property is not generated because etching damage does not extend up to the interface between the first ferromagnetic layer 14 and the pinning layer 13. Moreover, since the region making contribution as the magnetic readback signal is specified with the second ferromagnetic layer 16 and intermediate layer 15 and the region magnetically influenced by etching damage with the etching process is located at higher position along the sensor height direction than the above region, influence on the property may be assumed to be rather small. Accordingly, the head performance dose not show any reduction in the output and therefore reproducing property showing excellent stability can be attained.

As the pinning layer 13 in this structure, the antiferromagnetic films such as Pt—Mn system alloy, Mn—Ir system alloy and the hard magnetic films such as Co—Pt system alloy and Co—Cr—Pt system alloy may be used. As the first ferromagnetic layer 14 and the second ferromagnetic layer 16, the Ni—Fe system alloy, Co—Fe system alloy, Co—Ni—Fe system alloy, and high polarization materials such as magnetite and Heusler alloy and the stacked film of these elements may be used and moreover multilayered films where ferromagnetic layers are stacked via the spacer of 10 Å or less may also be used. In addition, the effect of the present invention is never changed even when the structure where the taper is extended up to the lower magnetic shield layer 11 as in the case of the second embodiment is employed and when the in-stack biasing structure is used as the magnetoresistive film as in the case of the third embodiment.

Fifth Embodiment

Figure 7:
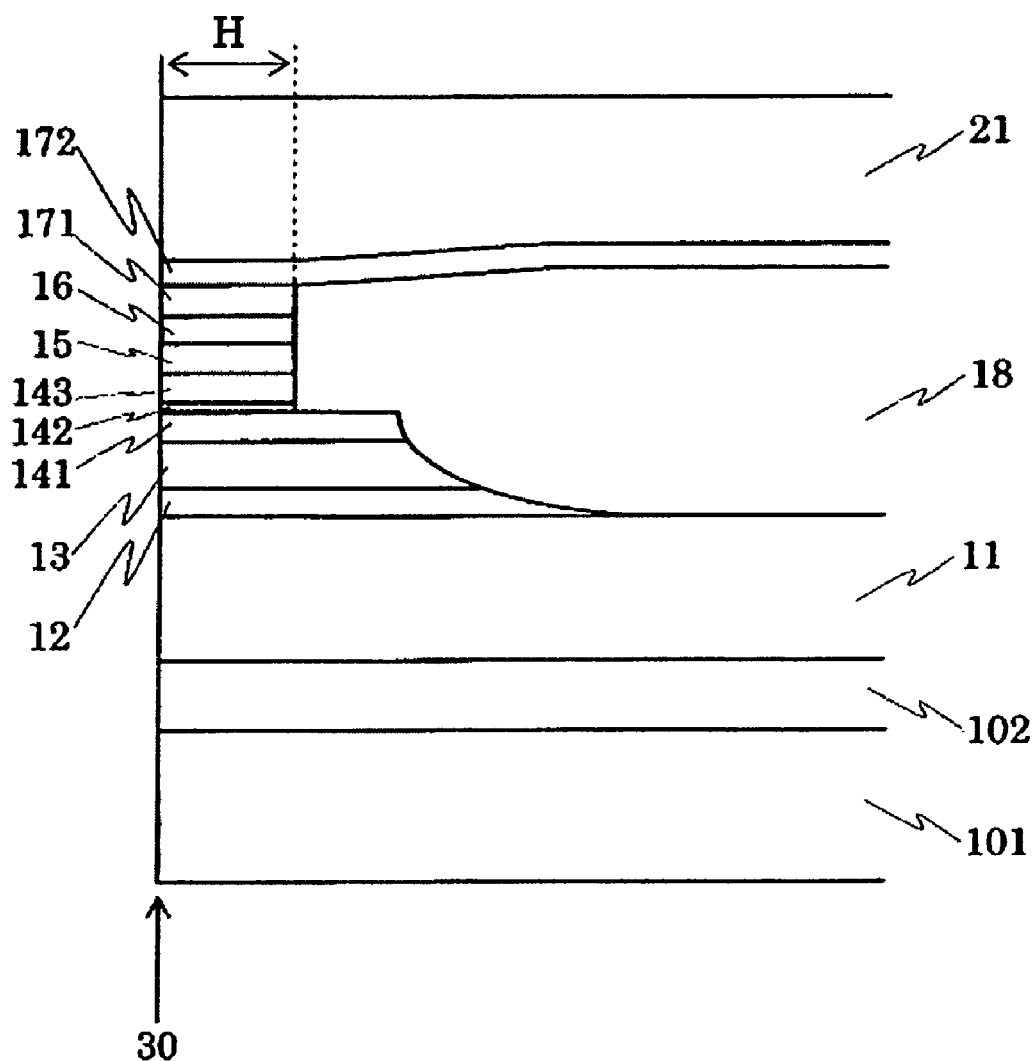
FIG. 7 is a cross-sectional structure diagram in the sensor height direction of the magnetic sensor of the CPP magnetoresistive head in accordance with an embodiment of the present invention.

FIG. 7 shows a cross-sectional structure of the magnetic sensor in the sensor height direction of another magnetoresistive head of the present invention. In this embodiment, the first ferromagnetic layer is formed as a try-layered film where a third ferromagnetic film 141 in the side of pinning layer 13, a spacer 142, and a fourth ferromagnetic film 143 in the side of the intermediate layer 15.

The first etching is stopped when the fourth ferromagnetic film 143 or the spacer 142 is etched, and the third ferromagnetic film 141 is not reduced in the physical film thickness. Length in the sensor height direction of bottom surface of the third ferromagnetic layer 141, which is in contact with the pinning layer 13, in the first ferromagnetic layer is equal to the length in the sensor height direction of top surface of the pinning layer. Both sensor height edges are continuous, but length in the sensor height direction of bottom surface of the fourth ferromagnetic layer 143 within the first ferromagnetic layer is shorter than the length in the sensor height direction of top surface of the third ferromagnetic layer 141. And these sensor height edges are discontinuous. In the structure explained above, the region near the film surface of the third ferromagnetic film 141 may be assumed to be deteriorated in property from the magnetic viewpoint but etching damage at the interface with the pinning layer 13 may be assumed to be small. Moreover, the region making contribution as the magnetic readback signal is specified with the second ferromagnetic layer 16 and the intermediate layer 15 and therefore the region magnetically damaged by the etching may be assumed to give lesser influence on the property because such region is located in the higher position along the sensor height direction than such region. Accordingly, reduction of output and instability of reproducing property can be suppressed even in the structure explained above.

As the pinning layer 13 in the structure explained above, the antiferromagnetic films such as Pt—Mn system alloy and Mn—Ir system alloy and the hard magnetic films such s Co—Pt system alloy and Co—Cr—Pt system alloy may be used. As the first ferromagnetic layer 14, third ferromagnetic layer 141, fourth ferromagnetic layer 142, Ni—Fe system alloy, Co—Fe system alloy, Co—Ni—Fe system alloy, high polarization material such as magnetite and Heusler alloy, and the stacked films of these elements may be used. Moreover, a multi-layered film stacking the tri-layered or more-layered ferromagnetic layer via the spacers may also be used. In addition, the effect of the present invention is never varied even when the structure where the taper is extended up to the lower magnetic shield layer 11 as in the case of the second embodiment is used and when the in-stack biasing structure is used as the magnetoresistive film as in the case of the third embodiment.

Sixth Embodiment

Figure 8:
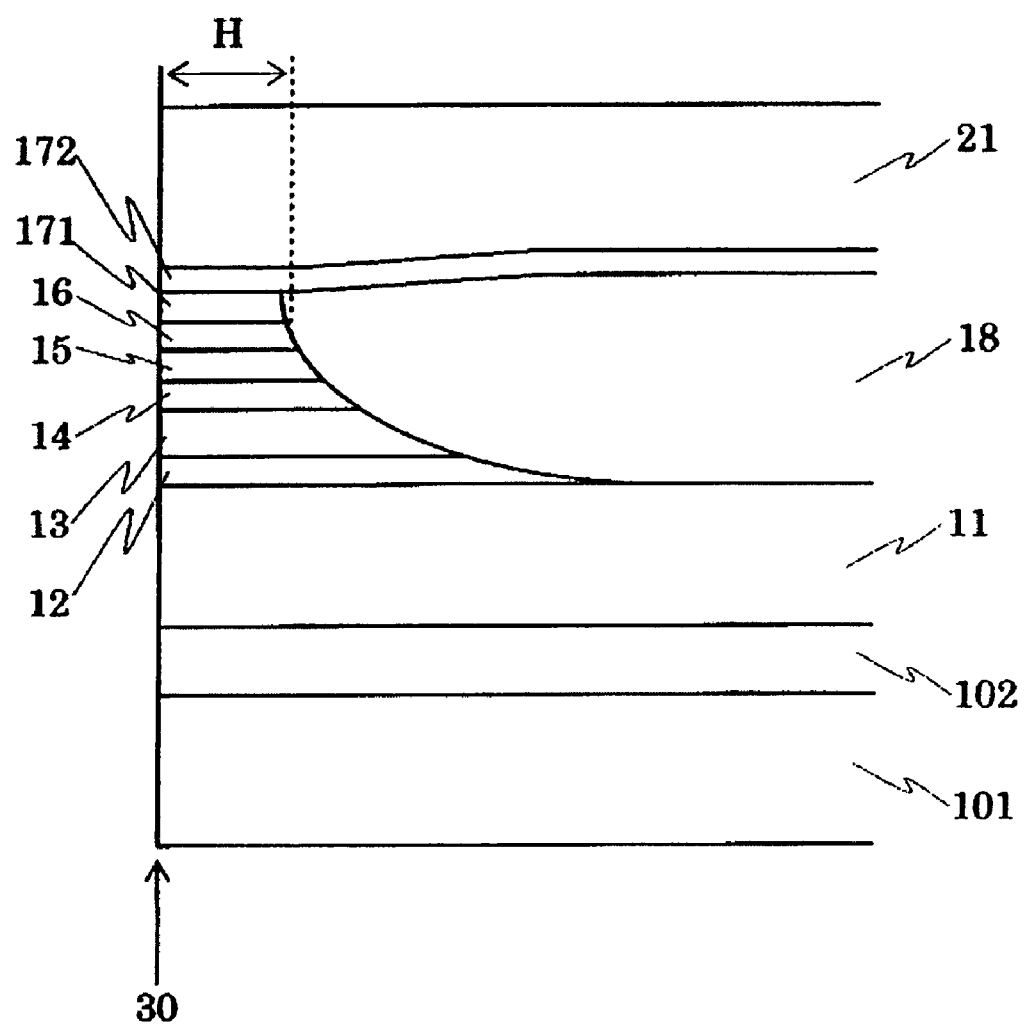
FIG. 8 is a cross-sectional structure diagram in the sensor height direction of the magnetic sensor of the CPP magnetoresistive head in accordance with an embodiment of the present invention.

FIG. 8 shows a cross-sectional structure in the sensor height direction of the magnetic sensor of the magnetoresistive head of an embodiment of the present invention which can be manufactured with the simplest process. The sensor height direction is specified with the length of the second ferromagnetic layer 16 and length in the sensor height direction of the layer in the side of substrate more than the second ferromagnetic layer 16 is set equal to or longer than such sensor height direction and such length becomes longer as it goes closer to the side of substrate. Since this shape can be realized by changing the etching conditions with the single-layered lift off mask.

From the viewpoint of suppressing etching damage, influence of etching damage of the pinning layer 13 deteriorates the exchange coupling property at the region near the edge in the sensor height direction of the interface between the pinning layer 13 and the first ferromagnetic layer 14, but since at least the pinning layer 13 is formed with inclusion of taper, etching damage spreads up to the constant depth from the surface of the taper of the pinning layer and damage does not spread to the entire part in the film thickness direction even in the region where the exchange coupling property is deteriorated. Even in the case of this structure, the sensor height direction refill film 18 can also be formed without generation of step. Accordingly, lowering of output can be reduced and instability of reproducing property can also be suppressed.

In above explanation, the magnetoresistive film utilizes the TMR effect where the intermediate layer is the tunneling barrier or utilizes the CPP-GMR effect where the intermediate layer is the conductive layer or the conductive layer including the confined-current-path layer. However, the devices where the sensing current flows through the film surface of materials forming the magnetoresistive film such as those utilizing a magnetic semiconductor and diffusion and accumulation phenomenon of polarized spin can also provide the effect similar to that of the present invention. Moreover, the lower gap layer 12, first upper gap layer 171, second upper gap layer 172 are not essential and these may also be eliminated if these are not required from the structural and manufacturing viewpoint.

Moreover, the magnetoresistive head has been explained above, wherein the magnetoresistive film is allocated to be exposed to the air bearing surface. However, the similar effect can also be obtained from the magnetoresistive head where the magnetoresistive film is allocated to the region recessed from the air bearing surface and thereby it is not exposed at all or partially exposed to the air bearing surface.

Figure 9:
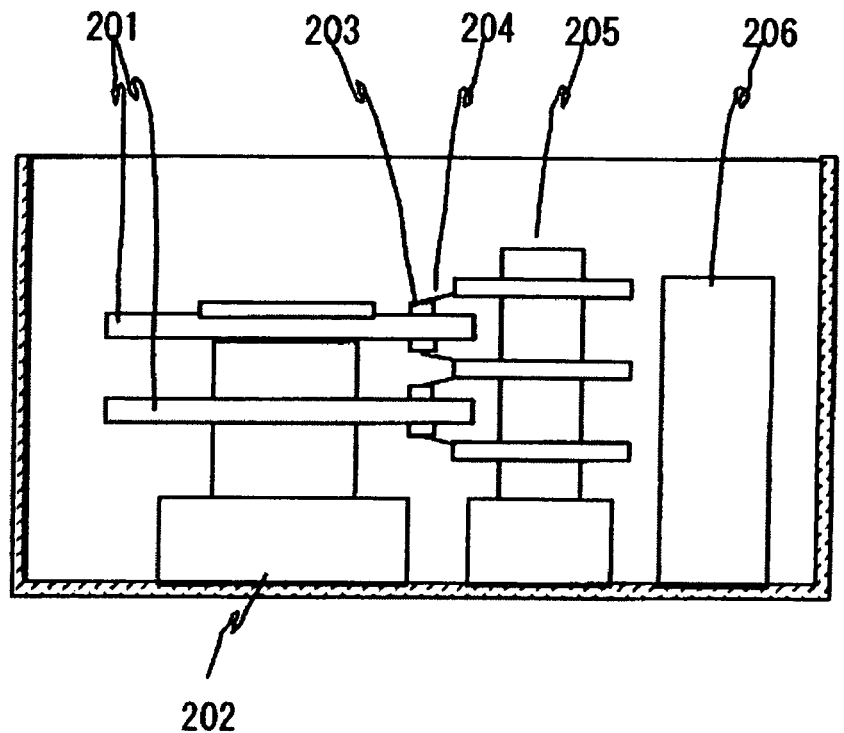
FIG. 9 is a schematic diagram of a magnetic storage apparatus.

Moreover, when the magnetoresistive head explained above in detail is used, it is possible to provide a magnetic storage apparatus having higher areal density. FIG. 9 is a schematic diagram of an embodiment of such magnetic storage apparatus. The magnetic storage apparatus comprises a magnetic disk 201 for magnetically writing information, a motor 202 for rotating the same magnetic disk, a magnetic head 203 for writing and reading information to and from the magnetic disk 201, a suspension 204 for supporting the magnetic head, an actuator 205 for positioning the magnetic head, and a read/write circuit 206 for processing the information (write and readback signals). As the read head of the magnetic head 203, the magnetoresistive head explained above in detail is used. A disk array apparatus can also be built by combining a plurality of magnetic storage apparatuses. In this case, since a plurality of magnetic storage apparatuses are used simultaneously, processing capability for information can be improved and reliability of this apparatus can also be enhanced.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A magnetoresistive head, comprising:
a lower magnetic shield layer;
a magnetoresistive film including a pinning layer, a first ferromagnetic layer, an intermediate layer, and a second ferromagnetic layer formed on said lower magnetic shield layer;
a sensor height direction refill film allocated in the sensor height direction of said magnetoresistive film; and
an upper magnetic shield layer formed on said magnetoresistive film and said sensor height direction refill film, said magnetoresistive head applying a sensing current to the interface between said first ferromagnetic layer and said intermediate layer and to the interface between said intermediate layer and said second ferromagnetic layer, characterized in that
the length of sensor height direction at bottom surface of said pinning layer is longer than the length of sensor height direction at bottom surface of said first ferromagnetic layer,
an angle formed by an edge of said pinning layer in the sensor height direction for the surface extended from bottom surface of said magnetoresistive film is smaller than the angle formed by an edge of said second ferromagnetic layer in the sensor height direction for the surface extended from bottom surface of said magnetoresistive film, and
the height of top surface of said sensor height direction refill film is equal to or higher than top surface of said magnetoresistive film.

2. The magnetoresistive head according to claim 1, characterized in that angle formed by an edge of said first ferromagnetic layer in the sensor height direction for the surface extended from bottom surface of said magnetoresistive film is smaller than the angle formed by an edge of said second ferromagnetic layer in the sensor height direction for the surface extended from said magnetoresistive film and is larger than the angle formed by an edge of said pinning layer in the sensor height direction for the surface extended from bottom surface of said magnetoresistive film.

3. The magnetoresistive head according to claim 1, characterized in that said first ferromagnetic layer has a multi-layered structure where a ferromagnetic layer is stacked in two or more layers via non-magnetic metallic layers.

4. The magnetoresistive head according to claim 3, characterized in that length in the sensor height direction of bottom surface of a third ferromagnetic layer in contact with said pinning layer among a plurality of ferromagnetic layers constituting said first ferromagnetic layer is equal to the length in the sensor height of top surface of said pinning layer and length in the sensor height direction of bottom surface of a fourth ferromagnetic layer constituting said first ferromagnetic layer allocated on said third ferromagnetic layer is shorter than the length in the sensor height direction of top surface of said third ferromagnetic layer.

5. The magnetoresistive head according to claim 1, characterized in that said pinning layer is formed of an antiferromagnetic layer.

6. The magnetoresistive head according to claim 1, characterized in that length in the sensor height of bottom surface of said intermediate layer is longer than the length in the sensor direction of the interface between said second ferromagnetic layer and said intermediate layer.

7. The magnetoresistive head according to claim 1, characterized in that length in the sensor height direction of bottom surface of said first ferromagnetic layer is longer than the length in the sensor height direction of top surface of said intermediate layer and an area which changes discontinuously in the length in the sensor height direction exists between top surface of said intermediate layer and bottom surface of said first ferromagnetic layer.

8. The magnetoresistive head according to claim 1, characterized in that length in the sensor height direction of bottom surface of said intermediate layer is longer than the length in the sensor height direction of top surface of said second ferromagnetic layer and an area which changes discontinuously in the length in the sensor height direction exists between top surface of said second ferromagnetic layer and bottom surface of said intermediate layer.

9. The magnetoresistive head according to claim 1, characterized in that a distance between said lower magnetic shield layer and said upper magnetic shield layer at higher position along the sensor height direction than said magnetoresistive film is larger than the distance between the said lower magnetic shield layer and said upper magnetic shield layer at an air bearing surface.

10. The magnetoresistive head according to claim 1, characterized in that a longitudinal biasing layer and a second pinning layer are stacked on said second ferromagnetic layer via a layer for controlling coupling fields, length in the sensor height direction of bottom surface of said intermediate layer is longer than the length in the sensor height direction of top surface of said second ferromagnetic layer, and an area which changes discontinuously in the length of sensor height direction exists between top surface of said second ferromagnetic layer and bottom surface of said intermediate layer.

11. The magnetoresistive head according to claim 1, characterized in that length in the sensor height direction of bottom surface of said pinning layer is longer than the length in the sensor height direction of top surface of said first ferromagnetic layer and an area which discontinuously changes in the length in the sensor height direction exists between top surface of said first ferromagnetic layer and bottom surface of said pinning layer.

12. A manufacturing method of a magnetoresistive head comprising the steps of:
forming on a substrate a lower magnetic shield layer, a lower gap layer, a pinning layer, a first ferromagnetic layer, an intermediate layer, a second ferromagnetic layer, and an upper gap layer;
forming a bi-layer resist pattern including a lower layer resist and an upper layer resist longer in the length in the sensor height direction than said lower layer resist allocated on the same lower layer resist as a mask for etching up to said second ferromagnetic layer or said intermediate layer;
conducting a first etching for etching up to said second ferromagnetic layer or said intermediate layer by irradiating etching ion in a first incident angle from the normal direction of substrate using said bi-layer resist pattern as a mask,
conducting thereafter a second etching for processing, in the sensor height direction, edges of at least said lower gap layer, pinning layer, and first ferromagnetic layer into the tapered shape by etching up to said lower gap layer through irradiation of the etching ion in a second incident angle smaller than said first etching angle from the normal direction of substrate;
forming a sensor height direction refill film;
removing said bi-layer resist pattern; and
forming an upper magnetic shield layer.

13. A manufacturing method of magnetoresistive head, characterized by comprising the steps of:

forming on a substrate a lower magnetic shield layer, a lower gap layer, a pinning layer, a first ferromagnetic layer, an intermediate layer, a second ferromagnetic layer, and an upper gap layer;

forming a first resist pattern as a mask for etching up to said second ferromagnetic layer or intermediate layer;

conducting a first etching up to said ferromagnetic layer or intermediate layer by inputting etching ion in a first incident angle from the normal direction of a substrate using said first resist pattern as a mask;

removing said first resist pattern;

forming a second resist pattern longer than said first resist pattern in the length of sensor height direction as the mask for etching up to said lower magnetic shield layer;

conducting a second etching for processing, in the sensor height direction, edges of at least said lower gap layer, pinning layer, and first ferromagnetic layer into the tapered shape by etching up to said lower gap layer through irradiation of the etching ion in a second incident angle larger than said first etching angle from the normal direction of substrate using said second resist pattern as a mask;

forming a sensor height direction refill film;

removing said bi-layer resist pattern; and forming an upper magnetic shield layer.

\* \* \* \* \*